Sept. 11, 1923.

L. PATTON

INSECT CATCHER

Filed July 8, 1922   2 Sheets-Sheet 1

1,467,495

Inventor
LUTHER PATTON

Sept. 11, 1923.
L. PATTON
INSECT CATCHER
Filed July 8, 1922
1,467,495
2 Sheets-Sheet 2
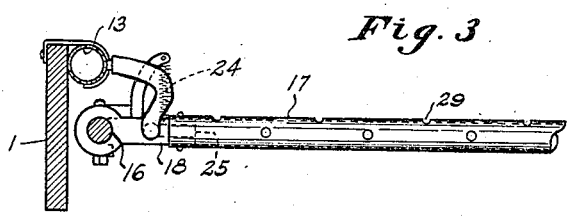
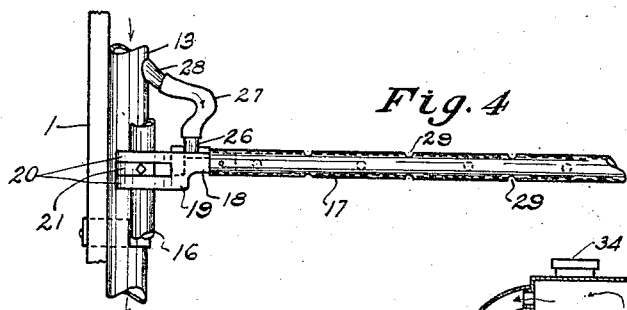
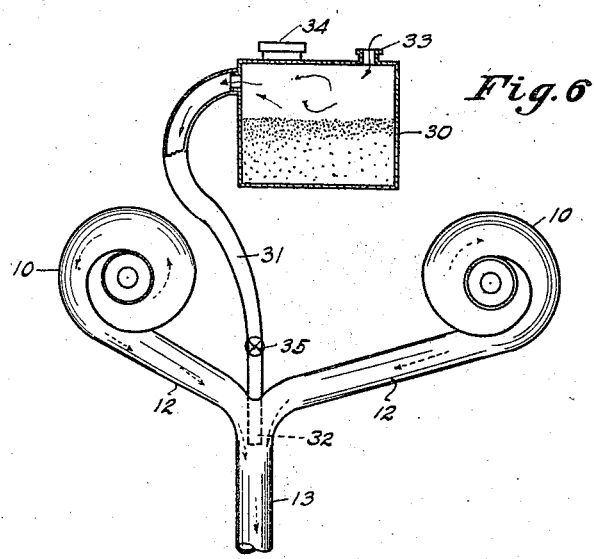
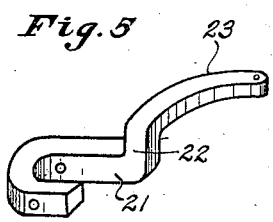
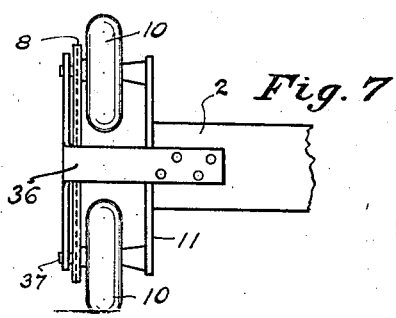
Inventor
LUTHER PATTON.
Attorney Patented Sept. 11, 1923.

1,467,495

UNITED STATES PATENT OFFICE.

LUTHER PATTON, OF BIRMINGHAM, ALABAMA.

INSECT CATCHER.

Application filed July 8, 1922. Serial No. 573,651.

*To all whom it may concern:*

Be it known that I, LUTHER PATTON, a citizen of the United States of America, residing at Birmingham, in the county of Jefferson and State of Alabama, have invented certain new and useful Improvements in Insect Catchers, of which the following is a specification.

My invention relates to an improvement in insect catchers of the type in which a wheel supported frame adapted to straddle a row of plants to be treated carries both plant agitating means to dislodge the insects therefrom and collecting troughs to catch them.

The distinctive feature of my present invention relates to the combination in the machine of both agitating and blowing means for the more effective dislodging of the insects.

A further object is to adapt the blowing means to discharge a poison, preferably in the form of dust entrained in the air blast, so that it will be sprayed on the plants.

A further distinctive feature of my invention is the utilization of a spring-pressed hollow agitating finger through which a blast of air, whether or not serving as a bearer of a poison element, is directed in jets against the limbs and all parts of the plant under treatment to more effectively dislodge the insects therefrom and cause them to fall into and to be caught in the collecting troughs.

My invention also comprises the novel details of construction relating to the means for producing the blast of air; the means for mounting the blower agitators on the machine; and the arrangement of parts for delivering the air blast to the movable blower agitators.

My invention also comprises the novel details of construction and arrangements of parts, which are hereinafter more particularly described and set forth in the appended claims, reference being had to the accompanying drawings which form a part of this specification, and in which:—

Figs. 3 and 4 are enlarged detail views in plan and rear elevation of a blower agitator and the manner of mounting the same and delivering the air current thereto.

Fig. 5 is a detail view of a stop and spring finger for a blower agitator.

Fig. 6 is a detail vertical cross-sectional view taken through the blowers, blast pipe and poison container on one side of the machine.

Fig. 7 is a detail plan view of an outboard bearing bracket for the blower drive shafts.

Similar reference numerals refer to similar parts throughout the drawings.

Figure 1:
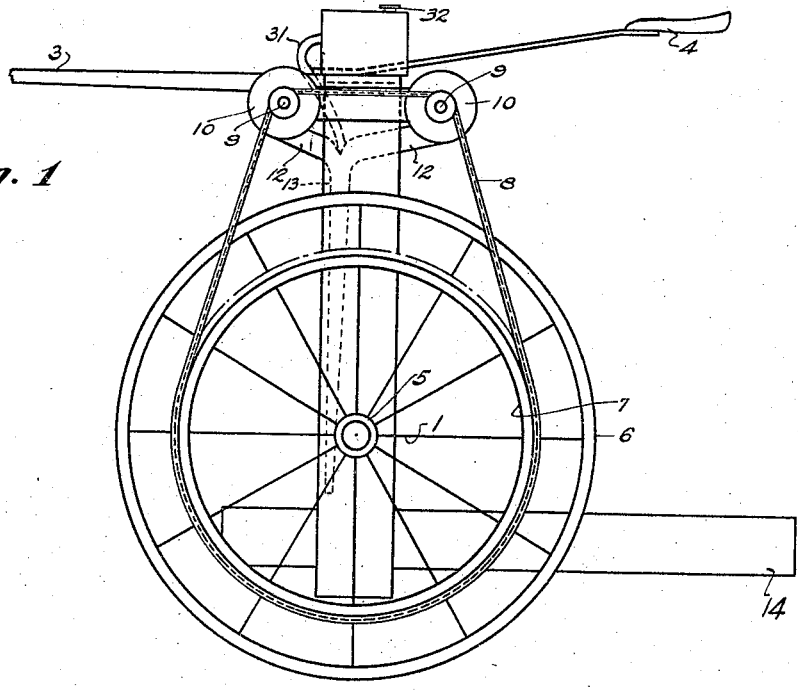
Fig. 1 is a side elevation of my improved machine.
Figure 2:
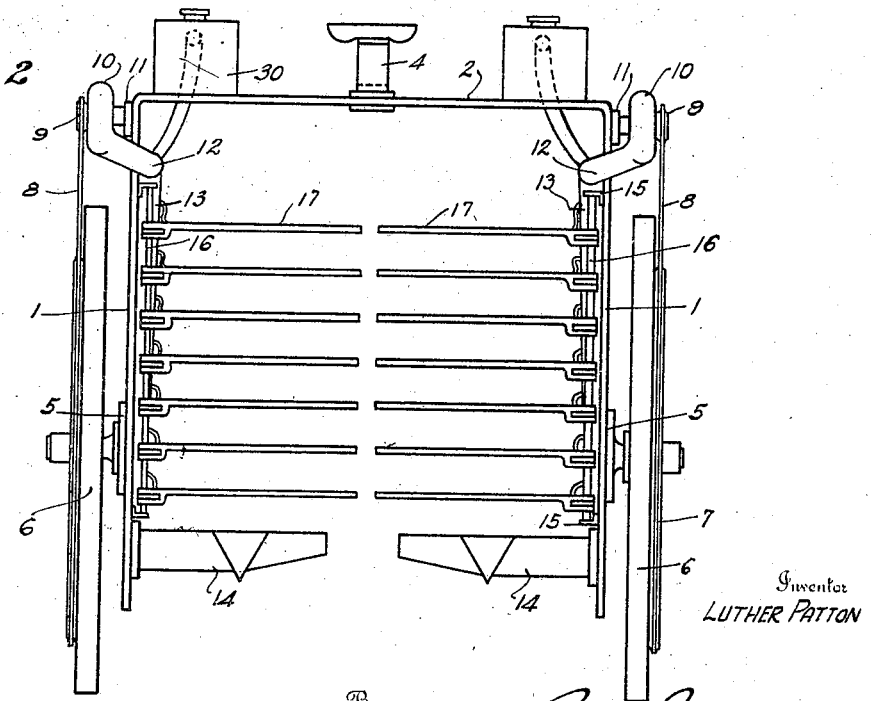
Fig. 2 is a rear end elevation of Fig. 1.

In the preferred embodiment of my invention, which is illustrated in the accompanying drawings, I show my machine as comprising an inverted U-shaped frame having vertical side members 1 and a horizontal cross top member 2 to which latter is suitably connected a draft element, such as a tongue 3, and upon which is mounted the driver's seat 4, if it be desired to equip the machine with such. Near the lower ends of the frame sides 1 I mount axle bearings 5 upon which are journaled wheels 6, spaced so as to straddle a row of plants, and to the outer side of each wheel I attach a sprocket wheel 7, which, by means of a sprocket chain 8, serves to drive two small sprocket wheels 9, each of which serves to drive the rotating element of its respective rotary blower 10. These blowers are mounted on brackets 11 at the upper end of each frame side 1 and the two blowers on the same side of the machine both deliver a blast of air through converging ducts 12 into a common blast pipe 13, which extends down along the inner face of the adjacent frame side 1 and is suitably held in position thereon by clamps or brackets 14ª. I mount near the lower ends of the frame sides 1 troughs 14 which may be of any suitable type and supported or braced in any suitable manner, and these troughs extend inwardly so as to leave space between them for the plant stalks to pass while the plant foliage will overhang the troughs. On the inner face of each frame side 1 I mount upper and lower aligning brackets 15 and in each pair of such brackets I mount a vertical shaft 16. This shaft may be mounted rigidly or it may be adapted to turn as is described in my companion application, Serial No. 563,393, filed the 24th day of May, 1922.

On each of these shafts 16, which is disposed just in the rear of the adjacent air blast pipe 13, I mount a series of blower agitator arms, of which there may be as many as desired on each shaft. All of these blower agitators are alike and a description of one will apply to all. Each blower agitator is formed by a light tubular body 17 closed at its free end and mounted at its other end tight on a nipple 18 on a yoke bearing casting 19. This casting is provided with upper and lower spaced bearing arms 20 having vertically aligning openings through which the shaft 16 passes. Between the yoke bearing arms of each casting 19 I mount fast on the shaft 16 a bracket 21 which occupies the space between the yoke arms 20 and has a shoulder 22 which extends in front of the yoke casting 19 in position to serve as a stop for it. The stop element carries front spring arm 23 to the feed end of which is connected a spring 24 which at its other end is connected to the adjacent casting 19 and thus serves to hold the latter in its forward position against the stop 22 while permitting the blower agitator to yield rearwardly to avoid injuring the plant.

I provide in each casting 19 an air duct 25 having a nipple 26 to which is connected a flexible pipe connection 27 which at its other end is connected to one of a series of nipples 28 on the air blast pipe 13, which latter pipe is closed at its lower end. The agitator tube or pipe 17 is provided with a series of air discharge ports 29 extending for its length along the top, front and bottom surfaces thereof and thus serving to discharge jets of air upwardly, forwardly and downwardly against the plant. The flexible connections 27 are so arranged and disposed as to leave the agitators quite free to swing backwardly so as not to injure the plants, and, as heretofore stated, there may be as many of these blower agitators on each side of the machine as conditions require.

If it is desired to utilize the air jets to distribute a poison on the plant as well as to dislodge the insects, I make provision for this by mounting on the top frame member 2 one or more containers 30. Two of these are shown and they are adapted to contain a poison in dust or powder form. I lead an outlet duct or pipe 31 from the upper portion of each container and cause it to open into the upper end of the adjacent blast pipe 13, preferably entering at the juncture of the two ducts 12 and having its discharge end 32 projecting into the pipe 13 sufficiently for the blasts of air on each side passing it to operate with an ejector effect so that it will tend to create a vacuum in the pipe 31. This vacuum is relieved through an air inlet port 33 in the top of the container at the far side thereof from the point of entrance of the pipe 31. A resultant current of air will be drawn in through the port 33 and as it flows through the container it will entrain particles of the dust and carry them with it so as to discharge them through the blower agitator ports onto the plant. The jolting movement of the machine itself facilitates the agitation and the discharge into the air blast of the poison particles. A removable filler cap 34 is provided for charging the container 30 with the poison. Preferably this is a screw cap to prevent air leakage. If desired, a regulating valve 35 may be provided in the pipe 31 for controlling the volumetric flow of air therethrough and hence to regulate the amount of poison applied.

In operation, as the machine is drawn along over a row of plants to be treated with the spaced troughs straddling the row, the wheels 6 as they turn serve to drive the four blowers 10, and the blasts of air induced by the blowers are directed through the ducts 12 and delivered into the adjacent blast pipe 13, whence the air flows through the flexible connections 27 and the ducts 12 in each yoke 19 into the tubular blower agitators 17, from which it is discharged in high velocity jets upwardly, forwardly and downwardly against the plants. At the same time the agitators strike the plants and shake them in the manner well understood in this art so as to cause the insects to drop and be caught in the collecting troughs below. The blower agitators are free to swing about the shafts 16 as an axis on the brackets 21 as a bearing, being held against their respective stops 22 by their respective coil springs 24, and as the machine progresses along the row it will act most effectively to shake and blow off from the plants the bugs and insects thereon and, if it is desired to treat the plants with a poison, the containers 30 are provided and charged with the poison in dust or other form and the valves 35 are adjusted to regulate its feed to the air blast. The poison laden jets of air are then available to apply the poison to the top, bottom and sides of the leaves, squares and limbs of the plant, while at the same time tending to blow off and dislodge any insects not shaken of by the agitators 17. While I prefer to utilize two smaller blowers on each side, it is understood that a single blower of equal capacity could be substituted.

I consider it desirable to provide an outboard bearing for the blower shafts 36 and this is shown more clearly in Fig. 7 and comprises a T-shaped bracket 37 having its shank riveted or otherwise attached to the top of the cross frame 2 and having its T-head bent down at right angles to the shank and extended laterally sufficiently to receive the outboard ends of the blower shafts. This will take the strain of the driving sprocket chain and hold the blowers rigidly in operating position.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Having thus described my invention, what I claim as new and desire to secure by Letters Patent, is:—

1. In a machine of the character described, a plurality of yieldable plant agitators carrying means for delivering air jets against the plants, and means to supply a blast of air to said jets.

2. A machine in accordance with claim 1, having means to entrain an insect poison in the blast of air.

3. In an insect catching and destroying machine, means to catch the dislodged insects, and means to dislodge the insects comprising tubular yieldable agitators, in combination with air blast means to discharge air jets through said agitators against the plant.

4. A machine in accordance with claim 3, in which said air blast means comprise a blower having a flexible connection to the tubular agitator, and a plurality of jet nozzles arranged lengthwise of the agitator.

5. In a machine of the character described, means to catch dislodged insects, and means to dislodge the insects, comprising swinging tubular agitators having a plurality of jet orifices, means to yieldingly hold said agitators in forward operating position, and an air blast means comprising a manifold having flexible connections to the inner end of said tubular agitators.

6. In a machine of the character described, a wheel supported frame, collecting troughs carried by the frame, agitators yieldably mounted to swing horizontally on the frame, blower means driven by the motion of the machine, and ducts to cause the induced blasts of air to be discharged from the agitators.

7. In a machine of the character described, a wheel mounted frame, collecting troughs carried by the frame, yieldably mounted agitators above the troughs, a blower means at each side of the machine, a drive from each wheel to the adjacent blower means, a manifold distributing pipe receiving the blast of air from its respective blower means, a jet duct in each agitator, and flexible connections from the manifold pipe to the jet ducts of its respective agitators.

8. A machine in accordance with claim 7, in which the blower means comprises a pair of rotary blowers at each side of the machine and the drive therefor is in the form of a sprocket and chain drive from the adjacent wheel.

9. In a machine of the character described, a wheel driven blower means, agitators carrying jet ducts, means connecting the agitator jet ducts with the blower means, a container for a poison in powder form, and an injector means to entrain the poison in an air current flowing to the agitator jet ducts.

In testimony whereof I affix my signature.

LUTHER PATTON.

Witness:
NOMIE WELSH.